US011643012B2

(12) United States Patent
Ogata

(10) Patent No.: US 11,643,012 B2
(45) Date of Patent: May 9, 2023

(54) DRIVING ASSISTANCE DEVICE, DRIVING SITUATION INFORMATION ACQUISITION SYSTEM, DRIVING ASSISTANCE METHOD, AND PROGRAM

(71) Applicant: NEC CORPORATION, Tokyo (JP)

(72) Inventor: Kazuki Ogata, Tokyo (JP)

(73) Assignee: NEC CORPORATION, Tokyo (JP)

(*) Notice: Subject to any disclaimer, the term of this patent is extended or adjusted under 35 U.S.C. 154(b) by 78 days.

(21) Appl. No.: 16/757,602

(22) PCT Filed: Oct. 3, 2018

(86) PCT No.: PCT/JP2018/037039
§ 371 (c)(1),
(2) Date: Apr. 20, 2020

(87) PCT Pub. No.: WO2019/087662
PCT Pub. Date: May 9, 2019

(65) Prior Publication Data
US 2021/0197722 A1 Jul. 1, 2021

(30) Foreign Application Priority Data
Nov. 6, 2017 (JP) .............................. JP2017-214163

(51) Int. Cl.
*G06V 20/59* (2022.01)
*B60R 1/00* (2022.01)
(Continued)

(52) U.S. Cl.
CPC .................. *B60R 1/00* (2013.01); *G06T 7/70* (2017.01); *G06V 20/58* (2022.01); *G06V 20/597* (2022.01);
(Continued)

(58) Field of Classification Search
CPC ............ G06T 7/70; G06T 2207/30261; G06K 9/00221; G06K 9/00805; G06K 9/00845;
(Continued)

(56) References Cited

U.S. PATENT DOCUMENTS

2006/0106538 A1* 5/2006 Browne .................. B60R 21/01
701/301
2009/0022368 A1* 1/2009 Matsuoka ............... G06F 3/013
382/103
(Continued)

FOREIGN PATENT DOCUMENTS

JP  H07-167668    *  7/1995
JP  H07-167668 A    7/1995
(Continued)

OTHER PUBLICATIONS

International Search Report of PCT/JP2018/037039 dated Dec. 11, 2018 [PCT/ISA/210].
(Continued)

*Primary Examiner* — Shaghayegh Azima
(74) *Attorney, Agent, or Firm* — Sughrue Mion, PLLC

(57) ABSTRACT

A driving assistance device includes: a line-of-sight direction detection unit that detects a direction of a line of sight of a driver of a moving body; an obstacle detection unit that detects a position of an obstacle in environs of the moving
(Continued)

body; an assessment criteria determination unit that determines assessment criteria of a look at the obstacle by the driver based on at least one of time, location, weather, a state of the moving body, and a state of the driver; and a warning processing unit that obtains an assessment result by applying, to the assessment criteria, a score computed based on the direction of the line of sight of the driver and the position of the obstacle, the warning processing unit determining at least one of whether or not a warning needs to be issued to the driver and a level of the warning, based on the assessment result.

8 Claims, 6 Drawing Sheets

(51) Int. Cl.
*G06T 7/70* (2017.01)
*G08G 1/16* (2006.01)
*G06V 20/58* (2022.01)
*G06V 40/16* (2022.01)

(52) U.S. Cl.
CPC .............. *G06V 40/16* (2022.01); *G08G 1/16* (2013.01); *B60R 2300/105* (2013.01); *B60R 2300/20* (2013.01); *B60R 2300/8093* (2013.01); *G06T 2207/30261* (2013.01)

(58) Field of Classification Search
CPC . B60R 1/00; B60R 2300/105; B60R 2300/20; B60R 2300/8093; G08G 1/16; G06V 20/58; G06V 20/597; G06V 40/16
See application file for complete search history.

(56) References Cited

U.S. PATENT DOCUMENTS

| | | | |
|---|---|---|---|
| 2013/0249395 A1* | 9/2013 | Hatakeyama | B60K 35/00 315/77 |
| 2015/0310758 A1* | 10/2015 | Daddona | G09B 9/02 434/30 |
| 2015/0339527 A1* | 11/2015 | Plummer | G06F 3/013 348/78 |
| 2016/0267335 A1* | 9/2016 | Hampiholi | B60K 28/06 |
| 2017/0060234 A1* | 3/2017 | Sung | G06F 3/147 |
| 2017/0329329 A1* | 11/2017 | Kamhi | G05D 1/0088 |
| 2018/0173975 A1* | 6/2018 | Adibi | B60W 30/146 |
| 2018/0297520 A1* | 10/2018 | Morimura | G02B 27/01 |
| 2019/0005341 A1* | 1/2019 | Korthauer | B60W 40/08 |

FOREIGN PATENT DOCUMENTS

| | | | |
|---|---|---|---|
| JP | 2006-163828 A | | 6/2006 |
| JP | 2009-116394 A | | 5/2009 |
| JP | 2009116394 A | * | 5/2009 |
| JP | 2009-237776 A | | 10/2009 |
| JP | 2009237776 A | * | 10/2009 |
| JP | 2014-120111 A | | 6/2014 |
| JP | 2014-153875 A | | 8/2014 |
| JP | 2014-194625 A | | 10/2014 |
| JP | 2014194625 A | * | 10/2014 |
| WO | 2011/064831 A1 | | 6/2011 |

OTHER PUBLICATIONS

JP Office Action for JP Application No. 2022-042315, dated Nov. 15, 2022 with English Translation.

* cited by examiner

DRIVING ASSISTANCE DEVICE, DRIVING SITUATION INFORMATION ACQUISITION SYSTEM, DRIVING ASSISTANCE METHOD, AND PROGRAM

CROSS REFERENCE TO RELATED APPLICATIONS

This application is a National Stage of International Application No. PCT/JP2018/037039, filed Oct. 3, 2018, claiming priority to Japanese Patent Application No. 2017-214163, filed Nov. 6, 2017, the contents of all of which are incorporated herein by reference in their entirety.

TECHNICAL FIELD

The present invention relates to a driving assistance device, a driving situation information acquisition system, a driving assistance method and a program.

BACKGROUND ART

In connection with driving assistance, the feature of identifying an obstacle that a driver is seeing based on the driver's line of sight has been proposed.

For example, the driving assistance device described in Patent Document 1 identifies an obstacle located at the intersection of the line-of-sight vectors of both eyes of the driver as an obstacle seen by the driver, and generates visual information relating to this obstacle.

The traveling assistance system described in Patent Document 2 determines whether or not a driver is gazing at a feature object lying ahead in the direction of advancement of a vehicle, based on a line-of-sight position, a line-of-sight circle and a field-of-view area of the driver, and provides guidance regarding the feature object if it is determined that the driver is not gazing thereon.

The diagnosis device described in document 3 diagnoses a driver's level of awareness of a target that is present in the periphery of a vehicle based on whether or not at least an area of the target is contained within the visual space of the driver of the vehicle.

The vehicular alert device described in Patent Document 4 stores information regarding whether or not a driver gazed at an obstacle, and avoids redundant alerts regarding obstacles already seen by the driver.

PRIOR ART DOCUMENTS

Patent Documents

[Patent Document 1]
  Japanese Unexamined Patent Application, First Publication No. 2014-153875
[Patent Document 2]
  Japanese Unexamined Patent Application, First Publication No. 2014-120111
[Patent Document 3]
  WO 2011/064831
[Patent Document 4]
  Japanese Unexamined Patent Application, First Publication No. 2006-163828

SUMMARY OF THE INVENTION

Problem to be Solved by the Invention

Even if a driving assistance device warns a driver of an obstacle, the danger cannot be avoided if the driver ignores the warning. If a driving assistance device frequently issues warnings even for obstacles with little risk, a driver's attention to warnings can be expected to become weaker and the warnings may be ignored.

In this regard, by identifying obstacles that the driver are seeing as mentioned above, it is possible to suppress warnings regarding obstacles seen by the driver and to reduce the frequency of warnings.

Meanwhile, there can be considered to be cases in which it is appropriate to issue a warning even when an obstacle is in the field of view of the driver, if the driver's recognition thereof is weak. Thus, it is preferable to be able to ensure both that frequent warnings are avoided and that warnings are issued in cases where there is a risk that danger will occur. As mentioned above, there can be considered to be cases in which it is appropriate to issue a warning to a driver even if an obstacle is in the field of view of the driver. However, if the frequency of warnings regarding obstacles in the field of view of the driver is too high, then a driver's attention to warnings can be expected to become weaker and the warnings may be ignored.

An example object of the present invention is to provide a driving assistance device, a driving situation acquisition system, a driving assistance method, and a program that can solve the above-mentioned problems.

Means for Solving the Problem

According to a first example aspect of the present invention, a driving assistance device includes: a line-of-sight direction detection unit that detects a direction of a line of sight of a driver of a moving body; an obstacle detection unit that detects a position of an obstacle in environs of the moving body; an assessment criteria determination unit that determines assessment criteria of a look at the obstacle by the driver based on at least one of time, location, weather, a state of the moving body, and a state of the driver; and a warning processing unit that obtains an assessment result by applying, to the assessment criteria, a score computed based on the direction of the line of sight of the driver and the position of the obstacle, the warning processing unit determining at least one of whether or not a warning needs to be issued to the driver and a level of the warning, based on the assessment result.

According to a second example aspect of the present invention, a driving situation information acquisition system includes: an on-board system that is to be mounted on a moving body; and a driving situation information acquisition device that communicates with the on-board system. The on-board system includes: a line-of-sight direction detection camera that captures an image of a face of a driver of the moving body; and an obstacle sensor for detecting an obstacle in environs of the moving body. The driving situation information acquisition device includes: a line-of-sight direction detection unit that detects a direction of a line of sight of the driver based on the image of the face of the driver; an obstacle detection unit that detects a position of the obstacle in the environs of the moving body based on sensing data from the obstacle sensor; an assessment criteria determination unit that determines assessment criteria of a look at the obstacle by the driver based on at least one of time, location, weather, a state of the moving body, and a state of the driver; and a driving situation information acquisition unit that computes an assessment value of the look at the obstacle by the driver by applying, to the assessment criteria, a score computed based on the direction of the line of sight of the driver and the position of the obstacle.

According to a third example aspect of the present invention, a driving assistance method includes: detecting a direction of a line of sight of a driver of a moving body; detecting a position of an obstacle in environs of the moving body; determining assessment criteria of a look at the obstacle by the driver based on at least one of time, location, weather, a state of the moving body, and a state of the driver; obtaining an assessment result by applying, to the assessment criteria, the direction of the line of sight of the driver and the position of the obstacle; and determining at least one of whether or not a warning needs to be issued to the driver and a level of the warning, based on the assessment result.

According to a fourth example embodiment of the present invention, a program causes a computer to execute: detecting a direction of a line of sight of a driver of a moving body; detecting a position of an obstacle in the environs of the moving body; determining assessment criteria of a look at the obstacle by the driver based on at least one of time, location, weather, a state of the moving body, and a state of the driver; obtaining an assessment result by applying, to the assessment criteria, the direction of the line of sight of the driver and the position of the obstacle; and determining, based on the assessment result, at least one of whether or not a warning needs to be issued to the driver and a level of the warning.

Effect of the Invention

According to an example embodiment of the present invention, it is possible to ensure both that frequent warnings are avoided and that warnings are issued in cases where there is a risk that danger will occur.

EMBODIMENTS FOR CARRYING OUT THE INVENTION

Hereinafter, example embodiments of the present invention will be described, but the example embodiments below do not limit the invention as claimed. Additionally, not all combinations of characteristics described among the example embodiments are necessarily essential to the solution according to the invention.

Hereinafter, moving images or still images that are successive in time (frame-advance still images) will be referred to as video. Additionally moving images and still images will be described collectively as images.

First Example Embodiment

Figure 1:
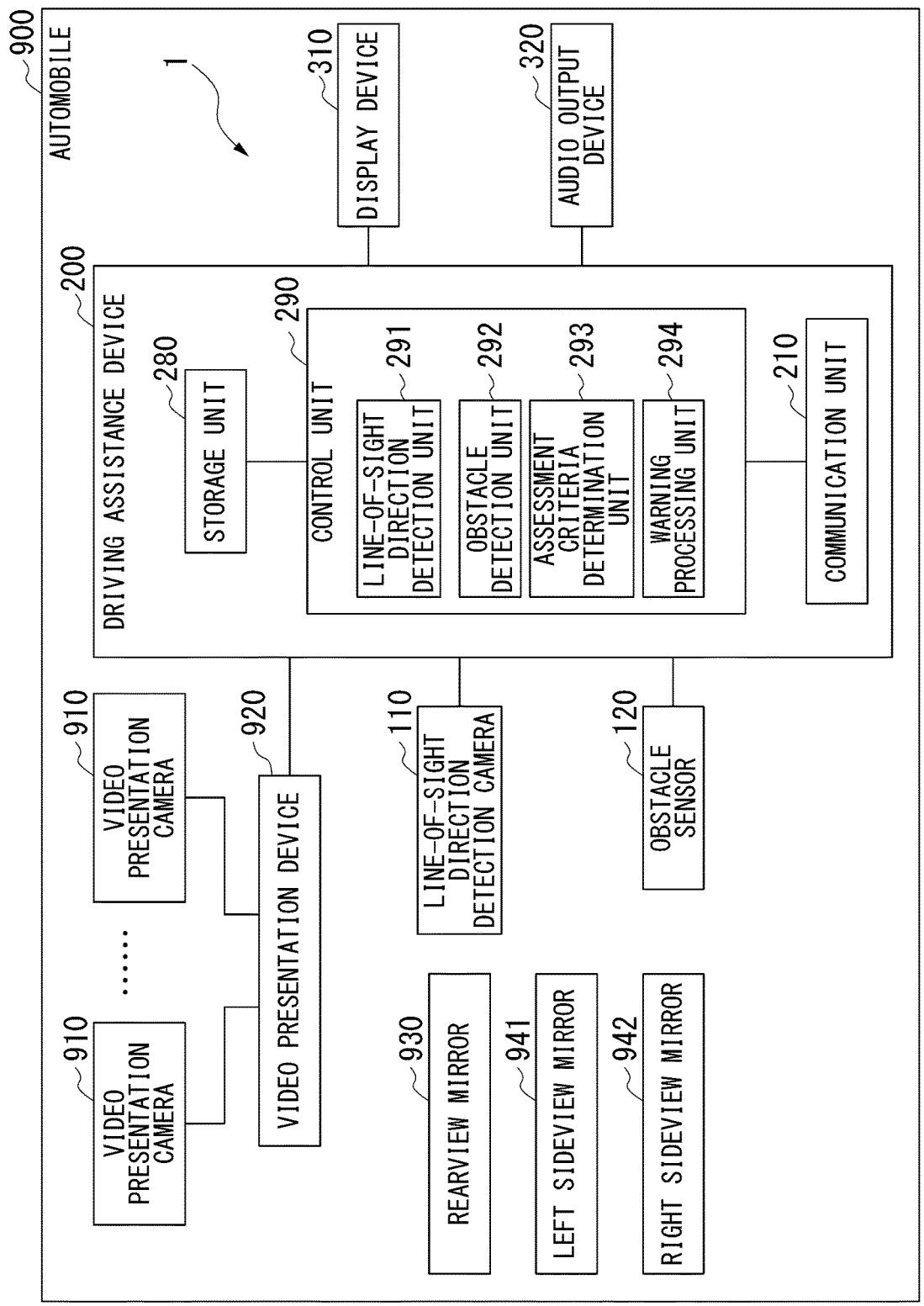
FIG. 1 is a schematic block diagram illustrating the functional structure of a driving assistance system according to the first example embodiment of the present invention.

FIG. 1 is a schematic block diagram illustrating the functional structure of a driving assistance system according to a first example embodiment of the present invention. As illustrated in FIG. 1, the driving assistance system 1 includes a line-of-sight direction detection camera 110, an obstacle sensor 120, a driving assistance device 200, a display device 310 and an audio output device 320. The driving assistance device 200 includes a communication unit 210, a storage unit 280 and a control unit 290. The control unit 290 includes a line-of-sight direction detection unit 291, an obstacle detection unit 292, an assessment criteria determination unit 293 and a warning processing unit 294.

Additionally, the driving assistance system 1 is mounted on an automobile 900. In the example illustrated in FIG. 1, the automobile 900 includes a video presentation camera 910, a video presentation device 920, a rearview mirror 930, a left sideview mirror 941 and a right sideview mirror 942.

The automobile 900 on which the driving assistance system 1 is mounted is referred to as the host vehicle from the viewpoint of the driving assistance system 1. Additionally, the automobile 900 on which the driving assistance system 1 is mounted will be referred to simply as the automobile 900.

The automobile 900 corresponds to an example of a moving body. However, the moving body in this case is not limited to being an automobile and may include various vehicles that need to be driven with attention to obstacles in the environs thereof.

The driving assistance system 1 assists the driving of a driver by warning the driver about obstacles in the environs of the automobile 900. In order to avoid issuing warnings too frequently and causing the driver to ignore the warnings, the driving assistance system 1 changes the threshold value for determining whether or not warnings are to be issued in accordance with the the surrounding environment.

The line-of-sight direction detection camera 110 is a camera for detecting the line of sight of the driver, which captures facial images of the driver.

The obstacle sensor 120 is a sensor for detecting obstacles in the environs of the automobile 900.

The obstacle sensor 120 is not limited to being a specific sensor. For example, the obstacle sensor 120 may be any one of an infrared sensor, an ultrasonic sensor, a laser sensor and a radar, or may be a combination of the above. The obstacle sensor 120 may be a sensor that captures images of the environs of the automobile 900 by means of a camera such as a stereo camera, and performs image analysis.

The video presentation camera 910 captures video of the environs of the automobile 900 and provides the video presentation device 920 with the captured video of the environs of the automobile 900.

The video presentation device 920 includes a monitor screen, and displays video of the environs of the automobile 900 by displaying the video from the video presentation camera 910 on the monitor screen.

The video presentation device 920 is able to switch between videos rather than to simply display a fixed video. For example, a plurality of video presentation cameras 910 may be provided on the automobile 900, and the video presentation device 920 may display video by switching between the video presentation cameras 910. Alternatively, one or more video presentation cameras 910 may be installed so as to be able to change the shooting direction. Alternatively, one or more video presentation cameras 910 may capture images over a wide range. In this case, the video presentation device 920 may display a partial video of the video captured by the video presentation camera 910, and may change the area of the video captured by the video presentation camera 910 that is extracted as the partial video.

The video presentation device 920 may automatically switch the video. Alternatively, a person may switch the video, such as by having the driver perform video switching operations.

Additionally, the video presentation device 920 has the function of detecting images of obstacles appearing in the video and displaying images of the detected obstacles in a highlighted manner. As the method by which the video presentation device 920 detects images of the obstacles appearing in the video and displays images of the detected obstacles in a highlighted manner, a known method may be used.

The driving assistance device 200 controls whether or not to issue a warning to the driver and the warning method based on the facial images of the driver captured by the line-of-sight direction detection camera 110 and the sensing data from the obstacle sensor 120.

The driving assistance device 200 is configured by using, for example, a computer such as an on-board computer.

Alternatively, the driving assistance device 200 may be provided outside the automobile 900, such as by being located on the cloud, and may exchange data by communicating with the automobile 900. In this case, the automobile 900 that is the processing target (the automobile 900 being processed) of the driving assistance device 200 is referred to as the host vehicle.

The communication unit 210 communicates with other devices. In particular, the communication unit 210 receives the images captured by the line-of-sight direction detection camera 110 as image data. Additionally, the communication unit 210 receives sensing data from the obstacle sensor 120. Additionally, the communication unit 210 receives, from the video presentation device 920, information indicating obstacles displayed in a highlighted manner by the video presentation device 920. Additionally, when the driving assistance device 200 issues a warning to the driver, the communication unit 210 transmits warning image data to the display device 310 and makes the display device 310 display the image, or transmits warning audio data to the audio output device 320 and makes the audio output device 320 output the audio.

The storage unit 280 stores various types of data. The storage unit 280 is configured by using a storage device provided in the driving assistance device 200.

The control unit 290 executes various processes by controlling respective units of the driving assistance device 200. The control unit 290 is configured by a CPU (Central Processing Unit) provided in the driving assistance device 200 reading out a program from the storage unit 280 and executing the program.

The line-of-sight direction detection unit 291 detects the direction of the driver's line of sight based on the images captured by the line-of-sight direction detection camera 110.

When there is a mirror in the driver's line of sight, the line-of-sight direction detection unit 291 sets the direction of the driver's line of sight as the direction of the light reflection destination (the direction normal to the mirror surface). Additionally, when the video presentation device 920 is in the driver's line of sight, the line-of-sight direction detection unit 291 determines that the driver is looking at whatever (an obstacle or the like) appears on the video presentation device 920, and in particular, determines that the driver sees an obstacle that the video presentation device 920 is displaying in a highlighted manner.

Figure 2:
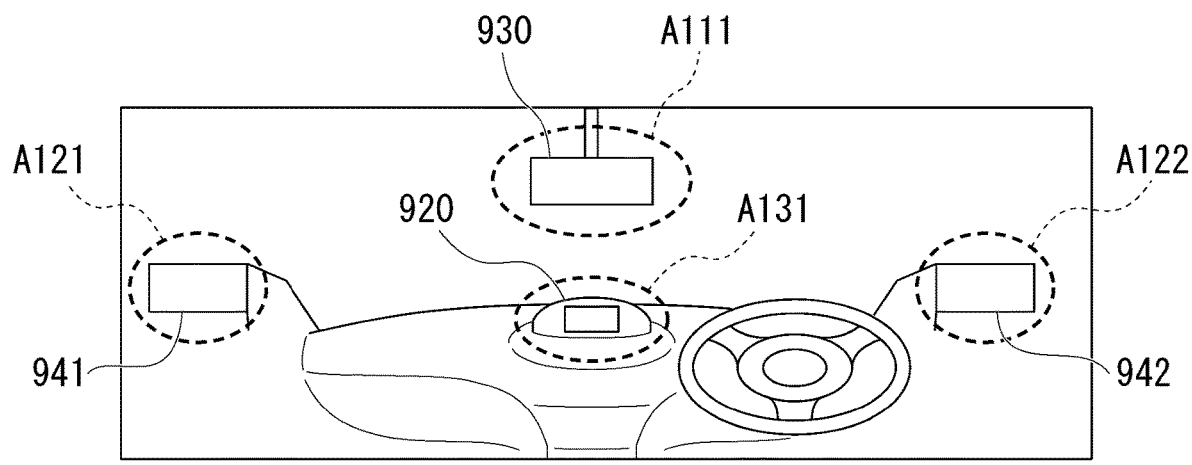
FIG. 2 is a diagram illustrating an example of the direction of the line of sight of a driver in the first example embodiment.

FIG. 2 is a diagram illustrating an example of the direction of a driver's line of sight. In FIG. 2, examples of things that can be seen from the driver's seat are illustrated. If the driver's line of sight is directed towards the rearview mirror 930, the left sideview mirror 941 or the right sideview mirror 942, then the line-of-sight direction detection unit 291 sets the direction of the driver's line-of-sight as the direction of the light reflected by these mirrors. Additionally, when the driver's line of sight is directed towards the monitor of the video presentation device 920, the line-of-sight direction detection unit 291 determines that the driver is looking at an obstacle or the like appearing on the monitor, and in particular, determines that the driver sees an obstacle that the monitor of the video presentation device 920 is displaying in a highlighted manner.

If it is determined, for example, that the driver's line of sight is directed within the range of the area A111, then the line-of-sight direction detection unit 291 determines that the driver is looking at the rearview mirror 930. If it is determined, for example, that the driver's line of sight is directed within the range of the area A121, then the line-of-sight direction detection unit 291 determines that the driver is looking at the left sideview mirror 941. If it is determined, for example, that the driver's line of sight is directed within the range of the area A122, then the line-of-sight direction detection unit 291 determines that the driver is looking at the right sideview mirror 942. If it is determined, for example, that the driver's line of sight is directed within the range of the area A131, then the line-of-sight direction detection unit 291 determines that the driver is looking at the monitor on the video presentation device 920.

The obstacle detection unit 292 detects the positions of obstacles in the environs of the automobile 900 based on sensing data from the obstacle sensor 120.

Figure 3:
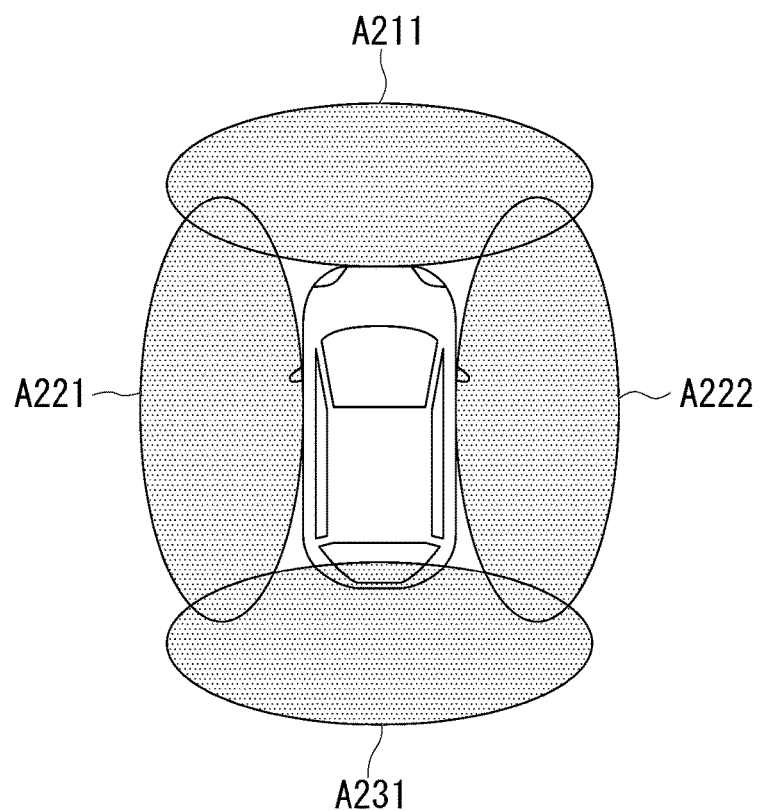
FIG. 3 is a diagram illustrating an example of areas in which the obstacle detection unit according to the first example embodiment detects the positions of obstacles.

FIG. 3 illustrates an example of the areas in which the obstacle detection unit 292 detects the positions of obstacles. In the example in FIG. 3, the obstacle sensor 120 is provided at each of the front, rear, left and right of the automobile 900. The obstacle detection unit 292 detects obstacles in any of the front area A211, the left-side area A221, the right-side area A222 and the rear area A231 of the automobile 900. In this way, the obstacle detection unit 292 detects obstacles around the entire periphery of the automobile 900, and thus can detect those obstacles irrespective of the directions from which the obstacles are approaching the automobile 900.

The assessment criteria determination unit 293 determines assessment criteria for assessing looks at an obstacle by a driver, based on at least one of the location, the weather, the state of the automobile 900 and the state of the driver. The assessment criteria for assessing looks at an obstacle by the driver may be criteria for computing the degree to which the driver recognizes a certain obstacle based on the looks. For example, the assessment criteria may be a formula including the product of a coefficient and the number of times the driver looked at an obstacle. The assessment criteria may be one or more coefficients. In this case, the assessment criteria determination unit 293 may determine the one or more coefficients based on the time, the location, the weather, the state of the automobile 900 and the state of the driver.

For example, when visibility is poor, such as at dusk or on a rainy day, it is difficult for a driver to recognize obstacles even when the obstacles are in the driver's field of view. Therefore, the assessment criteria determination unit 293 uses assessment criteria that are set so that the decision to issue a warning is more likely to be made and/or the warning level is more likely to be higher at dusk and during a rainy day than during the middle of a sunny day. For example, a coefficient that is set in the assessment criteria at dusk and on a rainy day may be made smaller than a coefficient that is set in the assessment criteria in the middle of a sunny day. Thus, by setting coefficients, the assessment scores computed by using the assessment criteria at dusk and during a rainy day tend to become smaller than the assessment scores computed by using the assessment criteria in the middle of a sunny day.

Thus, the assessment criteria determination unit 293 changes the assessment criteria in accordance with the conditions while driving. As a result thereof, the frequency or level of warnings to a driver by the driving assistance system 1 can be made lower, and in situations with relatively high risk, the driving assistance system 1 can make the frequency or level of the warnings higher. Due to this feature, according to the driving assistance device 200, it is possible to ensure both that frequent warnings are avoided and that warnings are issued when there is a risk that danger will occur.

The warning processing unit 294 assesses whether the driver has seen an obstacle by applying the direction of the driver's line of sight detected by the line-of-sight direction detection unit 291 and the position of the obstacle detected by the obstacle detection unit 292 to the assessment criteria determined by the evaluation criteria determination unit 293. In other words, the degree to which the driver has visually recognized an obstacle is assessed. For example, if a driver has not seen a certain obstacle even once, then the assessment value relating to that obstacle may be the minimum value. Furthermore, the warning processing unit 294 determines, on the basis of the assessment result, at least one of whether or not a warning needs to be issued to the driver and the level thereof.

Additionally, if the driver's line of sight is directed towards the video presentation device 920, then the warning processing unit 294 assesses that the driver has seen the obstacle about which a warning is being issued in the video being displayed by the video presentation device 920.

The warning processing unit 294 determines at least one of whether or not a warning needs to be issued to the driver and the level thereof on the basis of the relationship between the state of the automobile 900 and the position of the obstacle.

For example, when the automobile 900 is turning left at an intersection, even if a pedestrian is crossing the road on the far side of the intersection (straight ahead), there is no particular danger because the automobile 900 will not proceed in that direction. In this way, the warning processing unit 294 excludes, from the objects about which warnings are issued to the driver, obstacles that can be expected not to be sources of danger for the automobile 900 based on the direction of advancement of the automobile 900.

The display device 310 has, for example, a display screen such as a liquid-crystal display panel or an LED (Light-Emitting Diode) panel, and displays various types of images.

The audio output device 320 has a speaker, and outputs sounds.

The display device 310 and the audio output device 320 are used by the driving assistance system 1 to issue warnings to the driver. For example, the display device 310 may display a message providing a warning and an image of the obstacle that is the object of the warning, and the audio output device 320 may output an alarm sound.

The display device 310 and the audio output device 320 may be dedicated to the driving assistance system 1, or may be just one of the applications of devices having multiple applications provided in the automobile 900. For example, a display screen and a speaker provided in the video presentation device 920 may be used as the display device 310 and the audio output device 320.

Next, the operations of the driving assistance device 200 will be explained with reference to FIG. 4 and FIG. 5.

Figure 4:
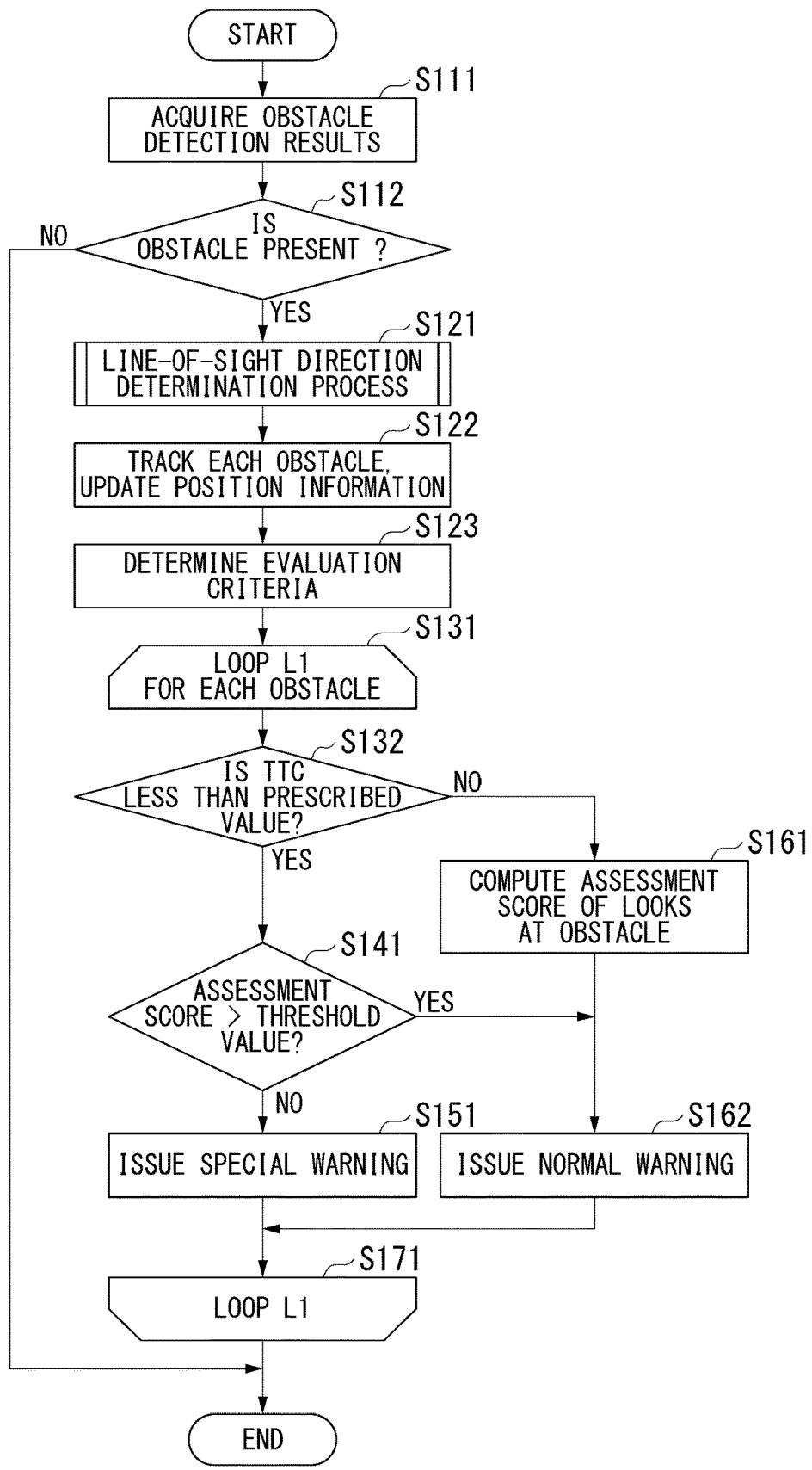
FIG. 4 is a flow chart illustrating an example of the processing procedure by which the driving assistance device according to the first example embodiment determines whether or not a warning needs to be issued to the driver, and when a warning is needed, the form thereof.

FIG. 4 is a flow chart illustrating an example of the processing procedure by which the driving assistance device 200 determines whether or not a warning needs to be issued to the driver, and when a warning is needed, the form thereof. The driving assistance device 200, for example, periodically performs the processing in FIG. 4.

In the processing in FIG. 4, the obstacle detection unit 292 acquires obstacle detection results (step S111). Specifically, the obstacle detection unit 292 acquires sensing data from the obstacle sensor 120 via the communication unit 210.

Next, the obstacle detection unit 292 determines whether or not there are obstacles in the environs of the automobile 900 (step S1112). Specifically, the obstacle detection unit 292 determines whether or not the sensing data from the obstacle sensor 120 indicates the presence of an obstacle within a prescribed distance from the automobile 900.

If the obstacle detection unit 292 determines that there are no obstacles (step S112: NO), the processing in FIG. 4 ends. In this case, the driving assistance system 1 does not especially issue a warning to the driver.

However, if the obstacle detection unit 292 determines that there is an obstacle in step S112 (step S113: YES), then the line-of-sight direction detection unit 291 detects (determines) the direction of the driver's line of sight (step S121).

Figure 5:
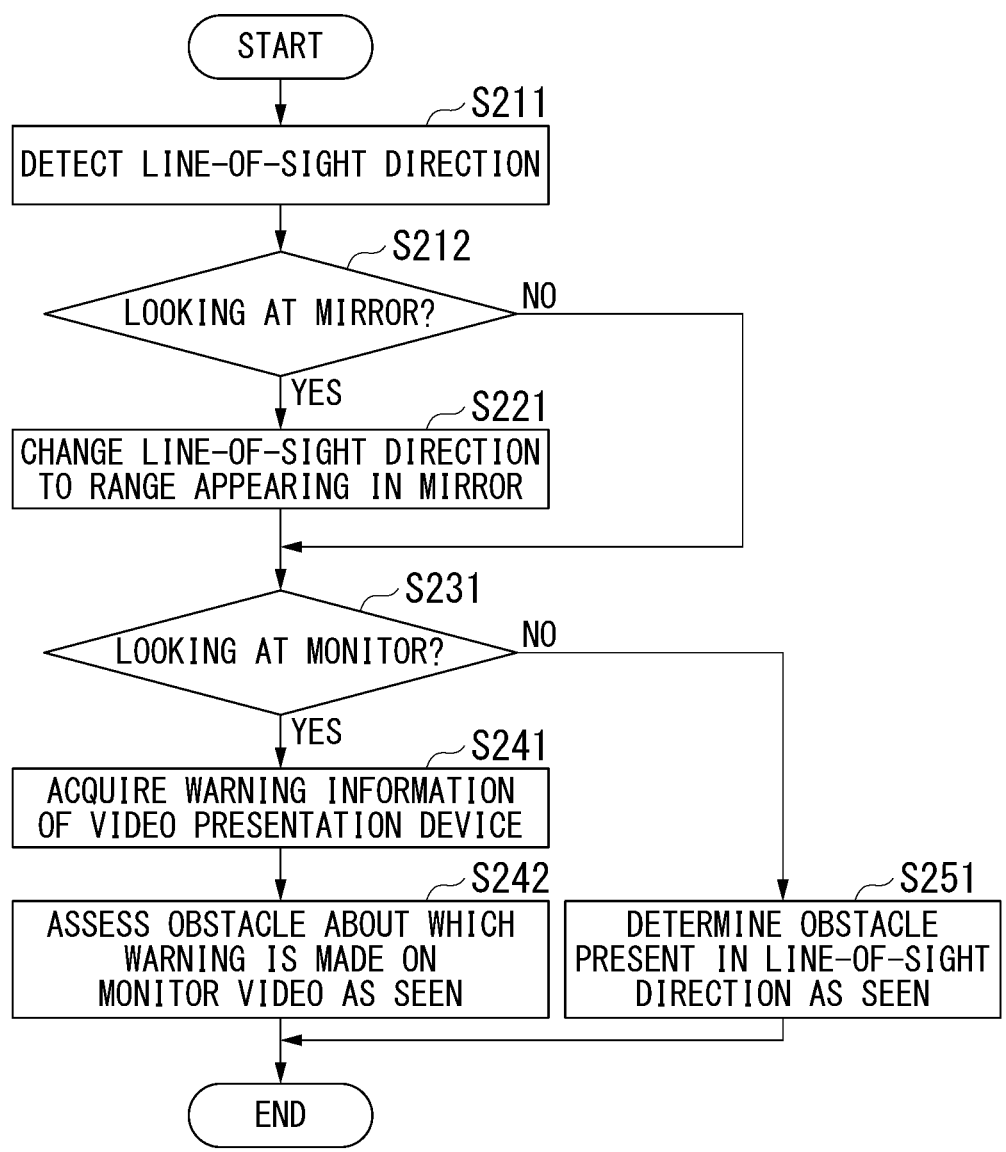
FIG. 5 is a flow chart illustrating an example of the processing procedure by which the line-of-sight direction detection unit according to the first example embodiment detects the direction of the driver's line of sight.

FIG. 5 is a flow chart indicating an example of the processing procedure by which the line-of-sight direction detection unit 291 detects the direction of the driver's line of sight. The line-of-sight direction detection unit 291 performs the processing in FIG. 5 in step S121 in FIG. 4.

In the processing in FIG. 5, the line-of-sight direction detection unit 291 detects the direction of the driver's line of sight on the basis of images of the driver captured by the line-of-sight direction detection camera 110 (step S211).

Next, the line-of-sight direction detection unit 291 determines whether or not the driver is looking at a mirror based on the direction of the driver's line of sight (step S212).

If the line-of-sight direction detection unit 291 determines that the driver is looking at a mirror (step S212: YES), then the line-of-sight direction detection unit 291 changes the direction of the driver's line of sight to the direction towards the image appearing in the mirror (step S221). Specifically, the line-of-sight direction detection unit 291 extends the direction of the driver's line of sight in the direction of light reflected by the mirror.

Next, the line-of-sight direction detection unit 291 determines, based on the direction of the driver's line of sight, whether or not the driver is looking at the monitor (monitor screen of the video presentation device 920) (step S231).

If the line-of-sight direction detection unit 291 determines that the driver is looking at the monitor (step S231: YES), then the line-of-sight direction detection unit 291 acquires warning information from the video presentation device 920 via the communication unit 210 (step S241). The warning information of the video presentation device 920 includes information identifying the obstacle about which the warning is being issued to the driver by the video presentation device 920 displaying it in a highlighted manner.

Next, the line-of-sight direction detection unit 291 assesses that the driver is looking at the obstacle about which a warning is being made (i.e., the obstacle that is being displayed in a highlighted manner) by the monitor video on the video presentation device 920 (step S242).

After step S242, the processing in FIG. 5 ends and the procedure returns to the processing in FIG. 4.

On the other hand, in step S231, if the line-of-sight direction detection unit 291 determines that the driver is not looking at the monitor (step S231: NO), then the line-of-sight direction detection unit 291 assesses that the driver is looking at an obstacle in the line-of-sight direction (step S251). In step S212, if the line-of-sight direction detection unit 291 assesses that the driver is looking at a mirror, then in step S251, it is assessed that the driver is looking at an obstacle present in the direction of the field of view reflected by the mirror.

After step S251, the processing in FIG. 5 ends and the procedure returns to the processing in FIG. 4.

On the other hand, in step S212, if the line-of-sight direction detection unit 291 determines that the driver is not looking at the mirror (step S212: NO), then the procedure advances to step S231.

After step S121 in FIG. 4, the obstacle detection unit 292 tracks the obstacles and updates the position information (step S122). Specifically, the obstacle detection unit 292 updates the positions of the obstacles for which position information was acquired when the process in step S122 was previously performed to positions indicated the sensing data of the obstacle sensor 120 obtained the current time. On the other hand, the obstacle detection unit 292 newly registers the position information (for example, stores the position information in the storage unit 280) for obstacles that were newly detected the current time.

Next, the assessment criteria determination unit 293 determines assessment criteria for assessing looks at an obstacle by a driver based on at least one of the time, the location, the weather, the state of the automobile 900 and the state of the driver (step S123). The assessment criteria determination unit 293 determines one or both of a threshold value for determination by a TTC (Time to Collision) in step S132 and a threshold value for determination by assessment score in step S141.

The TTC mentioned here is a value obtained by dividing the distance between the automobile 900 and the obstacle by the relative speed between the automobile 900 and the obstacle. The TTC indicates the time remaining until a collision will occur if the relative speed is maintained. By making the determination threshold value for the TTC large, the determination in step S141 will be made at an early stage at which the obstacle is positioned relatively far away. As explained below, a cumulative value over time is used as the assessment score. For this reason, by making the determination threshold value for the TTC large, the determination in step S141 will be made at a stage at which the value of the assessment score is relatively small. As a result thereof, it becomes more likely that a decision to warn the driver will be made (alternatively, it becomes more likely that the warning level will become higher).

When visibility is poor, such as at dusk or on a rainy day, it is difficult for a driver to recognize obstacles even when the obstacles are in the driver's field of view. Therefore, the assessment criteria determination unit 293 uses assessment criteria that are set so that the decision to issue a warning is more likely to be made (in other words, assessment criteria that are set so that the warning level is more likely to be higher) at dusk and during a rainy day than during the middle of a sunny day.

The case in which the decision to issue a warning is made more likely to occur (which is similar to the case in which the warning level is made more likely to be higher) will be explained. In this case, the assessment criteria determination unit 293, for example, sets the determination threshold value for the TTC (Time to Collision) in step S132 to be relatively large, and sets the determination threshold value for the assessment score regarding looks at the obstacle by the driver in step S141 to be relatively large. Alternatively, of these two threshold values, the assessment criteria determination unit 293 may set just one of the threshold values. In this case, the other threshold value may be a fixed value that is preset.

Regarding the location, if the automobile 900 is positioned, for example, at a location where it is difficult to take evasive action, such as an alley, then the assessment criteria determination unit 293 sets the determination threshold value to be a larger value (one or both of the TTC threshold value and the assessment score threshold value). Regarding the state of the automobile 900, the assessment criteria determination unit 293 sets the determination threshold value based on, for example, at least one of a turn signal, the steering wheel angle, the shift lever position and the vehicle speed.

For example, the assessment criteria determination unit 293 may refer to one or both of a turn signal operation and the steering wheel angle to assess the degree of a travel direction change of the automobile 900, such as the frequency of travel direction changes or the magnitude of the change angle. If the assessment criteria determination unit 293 determines that the degree of a travel direction change of the automobile 900 is greater than a prescribed threshold value, then the determination threshold value may be set to a higher value.

Additionally, the assessment criteria determination unit 293 may refer to one or both of the shift lever position and the vehicle speed to assess the degree of a travel direction change of the automobile 900, such as the frequency of travel direction changes or the magnitude of the change angle. If the assessment criteria determination unit 293 determines that the degree of a travel direction change of the automobile 900 is greater than a prescribed threshold value, then the determination threshold value may be set to a higher value.

Regarding the state of the driver, the assessment criteria determination unit 293 estimates the intensity of drowsiness in the driver based, for example, on the number of times the driver blinks or the period of time during which the driver's eyes are closed. If it is determined that the driver's drowsiness is more intense than the prescribed criteria, then the assessment criteria determination unit 293 sets the determination threshold value to a higher value.

Next, the control unit 290 starts a loop L1 for processing each obstacle (step S131). Hereinafter, the obstacles that are targets of processing in loop L1 will be referred to as processing target obstacles. The processing target obstacles may be all of the obstacles detected by the obstacle detection unit 292.

The processing in the loop L1 involves the warning processing unit 294 determining whether or not the TTC with respect to the processing target obstacle is less than the threshold value (step S132). As mentioned above, the assessment criteria determination unit 293 may set this threshold value.

If it is determined that the TTC is equal to or greater than the threshold value (step S132: NO), then the warning processing unit 294 computes an assessment score regarding looks at the processing target obstacle by the driver (step S161). In the processing in FIG. 4, the warning processing unit 294 adds up the scores while the TTC of the obstacle is equal to or greater than the threshold value.

For example, the warning processing unit 294 adds up the number of times or the amount of time that the driver looks at the processing target obstacle, based on the determination by the line-of-sight direction detection unit 291 in step S121, while the TTC of the obstacle is equal to or greater than the threshold value.

When computing the score, the warning processing unit 294 may add up values obtained by multiplying the number of looks or the amount of time thereof by a coefficient (look coefficient) corresponding to one or both of the TTC value and a type of look. For example, in the case of a direct look, the warning processing unit 294 multiples the number of looks and the amount of time thereof by a coefficient that is larger than that for the case of a look by a mirror. Additionally, in the case of a look by the video presentation device 920, if the processing target obstacle is displayed in a highlighted manner on the screen of the video presentation device 920, then the number of looks or amount of time thereof is multiplied by a coefficient that is even larger than that for the case of a direct look. Additionally, the smaller the TTC value (therefore, the closer the obstacle is to the automobile 900), the larger the coefficient that the warning processing unit multiples to the number of looks or the amount of time thereof.

Additionally, the warning processing unit 294 may change the value of the coefficient. For example, in the case of rain, it can be expected that the driver will have difficulty seeing the sideview mirrors (left sideview mirror 941 and right sideview mirror 942) due to water droplets adhering to the sideview mirrors and the like. Therefore, the warning processing unit 294 may make the coefficient smaller (make the look assessment relatively lower) for looks by the sideview mirrors in the case of rain. Additionally, at sites where there are many accidents when turning left, the warning processing unit 294 may make the coefficient larger for looks by the left sideview mirror 941.

The warning processing unit 294 may change the value of the coefficient so as to be linked to the determination of the assessment criteria by the assessment criteria determination unit 293. For example, when the assessment criteria determination unit 293 uses assessment criteria for rain, the warning processing unit 294 may make the coefficient smaller for looks by the sideview mirrors.

Next, the warning processing unit 294 performs a process that is defined as a normal warning (step S162). For example, the warning processing unit 294 makes the display device 310 display a message to the effect that there is an obstacle and does not make the audio output device 320 output a warning sound. Alternatively, the normal warning process may be defined to be not to issue a warning at all. In this case, it means that the warning processing unit 294 determines whether or not a warning is to be issued to the driver. The normal warning may also be an example of a case in which the warning level is low.

Next, the control unit 290 performs a termination process of the loop L1 (step S171). Specifically, the control unit 290 determines whether or not the processing in the loop L1 has been performed for all of the obstacles detected by the obstacle detection unit 292. If the control unit 290 determines that there is an obstacle that is unprocessed, then the procedure returns to step S131, and the processing in the loop L1 is successively performed on the unprocessed obstacle.

On the other hand, when the control unit 290 determines that the processing in the loop L1 has been completed for all of the obstacles, then the loop L1 ends. In this case, the processing in FIG. 4 ends.

On the other hand, if it is determined in step S132 that the TTC is less than the threshold value (step S132: YES), then the warning processing unit 294 determines whether or not the assessment score computed in step S161 is larger than a threshold value (step S141). As mentioned above, the assessment criteria determination unit 293 may set a threshold value for the assessment score.

If the warning processing unit 294 determines that the assessment score is larger than the threshold value (step S141: YES), then the procedure advances to step S162.

On the other hand, if the warning processing unit 294 determines that the assessment score is equal to or lower than the threshold value (step S141: NO), then a process that is defined as a special warning is performed (step S151). The special warning in this case is only required to be a warning to the driver that is stronger than the normal warning in step S162. The special warning may be an example of a case in which the warning level is high.

For example, the warning processing unit 294 may make the audio output device 320 provide an auditory warning by outputting an electronic sound with a different volume and tone from the case of a normal warning. Alternatively, the warning processing unit 294 may make the audio output device 320 provide an auditory warning by outputting audio including specific content such as "watch out to the rear left side" or the like. Alternatively, the warning processing unit 294 may display the image of the obstacle on the display device 310 in a highlighted state such as in a blinking manner or the like.

Additionally, the warning processing unit 294 may provide a visual warning by illuminating a screen or mirror that deserves attention.

After step S151, the procedure advances to step S171.

As described above, the line-of-sight direction detection unit 291 detects the direction of the line of sight of the driver of the automobile 900. The obstacle detection unit 292 detects the positions of obstacles in the environs of the automobile 900. The assessment criteria determination unit 293 determines assessment criteria for assessing looks at the obstacle by the driver based on at least one of the time, the location, the weather, the state of the automobile 900 and the state of the driver. The warning processing unit 294 assesses looks at obstacles by the driver by applying, to assessment criteria, scores computed on the basis of the direction of the driver's line of sight and the positions of obstacles, and determines, on the basis of the assessment results, at least one of whether or not a warning needs to be issued to the driver and the level thereof.

In this case, being based on the direction of the driver's line of sight may refer to being based on the period of time or the number of times that the driver saw an obstacle. Being based on the position of an obstacle may refer to a coefficient that varies in accordance with whether the driver is looking directly at the obstacle or the driver is looking indirectly at the obstacle through a mirror, i.e., a coefficient that varies in accordance with the method by which the driver saw the obstacle.

Thus, by having the assessment criteria determination unit 293 change the assessment criteria in accordance with the conditions when driving, it is possible to reduce the frequency of warnings to the driver by the driving assistance system 1, and in relatively high-risk situations, it can be made more likely for a decision for the driving assistance system 1 to issue a warning to be made. In this regard, according to the driving assistance device 200, it is possible to ensure both that frequent warnings are avoided and that warnings are issued when there is a risk that danger will occur.

Additionally, the warning processing unit 294 computes a score by adding up values obtained by multiplying the period of time or the number of times that the driver saw an obstacle by a coefficient corresponding to the method by which the driver saw the obstacle.

Thus, the warning processing unit 294 can compute scores with high precision by taking into account the method by which the driver saw an obstacle.

Additionally, the warning processing unit 294 assesses that the driver has seen an obstacle about which a warning is being made by video on the video presentation device if the direction of the driver's line of sight is towards the video presentation device.

In this case, if a warning about an obstacle is being made by video, then there is a possibility that the driver's attention will be drawn to the obstacle about which the warning is being made, and the driver's awareness of other obstacles about which the warning is not being made will become weaker.

The warning processing unit 294 can compute a score with high precision in that the score is computed in accordance with whether or not a warning has been made by video.

Additionally, the warning processing unit 294 further determines at least one of whether or not a warning needs to be issued to the driver and the level thereof based on the relationship between the state of the automobile 900 and the position of the obstacle. Thus, the warning processing unit 294 is able to suppress warnings to the driver regarding obstacles that can be expected to be of low risk in terms of the relationship to the automobile 900.

When it is able to be discerned that the driver has seen an obstacle, the warning processing unit 294 may change the warning method or end the warning.

Additionally, various forms can be used as the forms of looks via the video presentation device 920. For example, camera video may be displayed on a display screen such as a navigation screen, an instrument cluster or an electronic mirror. Alternatively, they may be in the form of warnings regarding specific obstacles made by indicators in a head-up display or in a mirror.

Additionally, the number of times that a driver saw or did not see obstacles may be recorded, and that information may be used for safe-driving guidance.

Additionally, determination information regarding the presence or absence of looks by the driver may be stored for a certain period together with camera video and sensor data, and may be used to understand the circumstances when an accident occurs.

Additionally, the warning processing unit 294 may switch between whether or not to implement the special warning based on the state of the automobile 900, such as the state of a turn signal, the steering wheel angle, the shift lever position, the vehicle speed and the like of the automobile 900, in addition to determining whether or not the driver has seen an obstacle. For example, if the left turn signal of the automobile 900 is on, then a warning regarding an obstacle detected on the left side of the vehicle may be issued on the basis of a determination as to whether or not the driver has seen the obstacle, whereas a warning may not be issued for an obstacle detected on the right side of the vehicle.

Second Example Embodiment

As described above, the driving assistance device may be provided outside the vehicle, such as on the cloud. In the second example embodiment, this feature will be explained.

Figure 6:
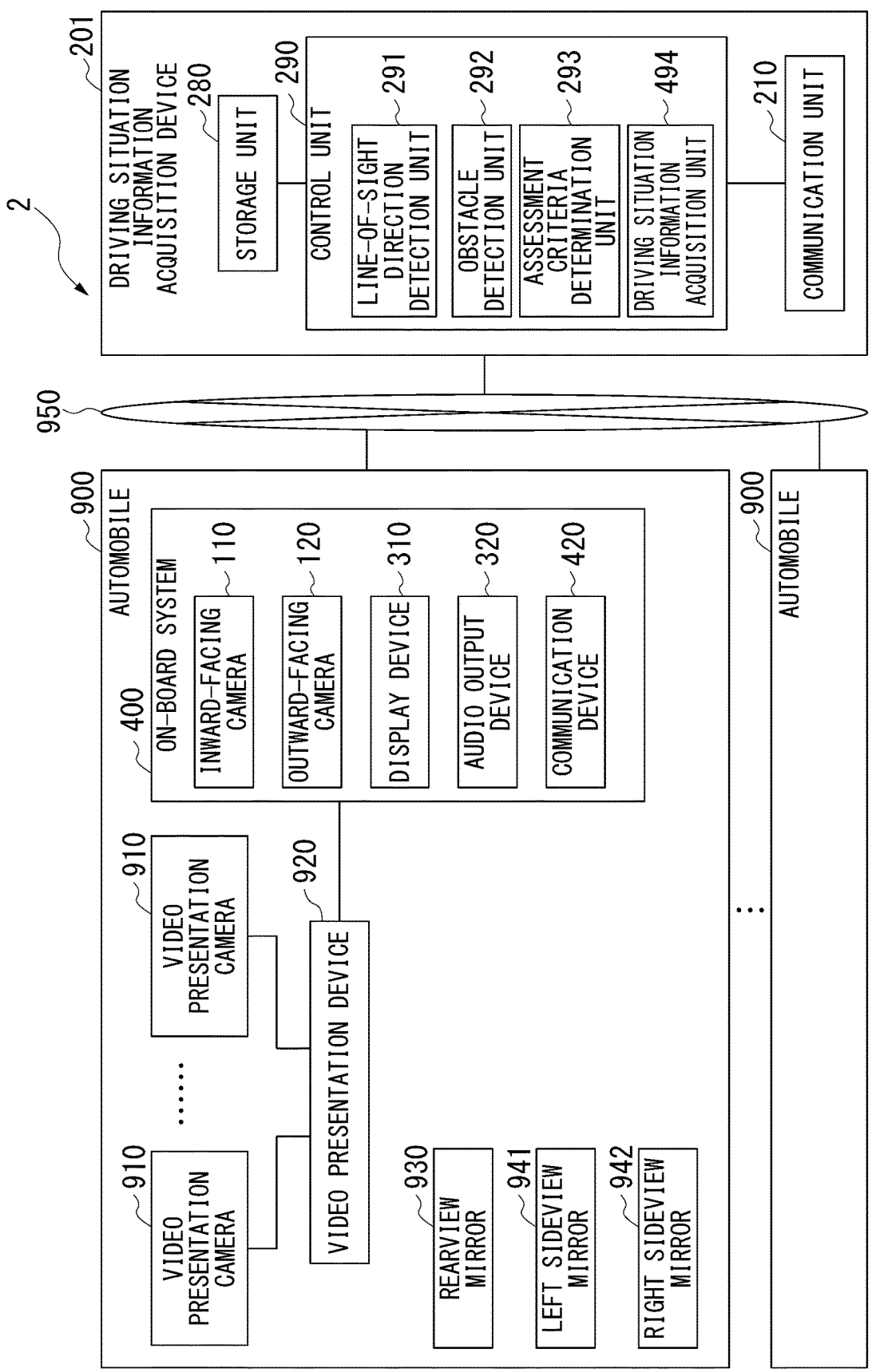
FIG. 6 is a schematic block diagram illustrating the functional structure of a driving situation information acquisition system according to a second example embodiment of the present invention.

FIG. 6 is a schematic block diagram illustrating the functional structure of a driving situation information acquisition system according to the second example embodiment of the present invention.

The driving situation information acquisition system 2 illustrated in FIG. 6 includes a driving situation information acquisition device 201 and an on-board system 400. The on-board system 400 includes a line-of-sight direction detection camera 110, an obstacle sensor 120, a display device 310, an audio output device 320 and a communication device 410. The driving situation information acquisition device 201 includes a communication unit 210, a storage unit 280 and a control unit 290. The control unit 290 includes a line-of-sight direction detection unit 291, an obstacle detection unit 292, an assessment criteria determination unit 293 and a driving situation information acquisition unit 494. The on-board system 400 and the driving situation information acquisition device 201 communicate via a network 950.

It is sufficient for the network 950 to be a communication network that can relay communications between the communication unit 210 in the driving assistance device 200 and the communication unit 410 in the on-board system. Due to the mobility of the automobile 900, it is preferable for the network 950 to communicate with the communication device 410 wirelessly. For example, the network 950 may be formed by a combination of the internet and a mobile telephone network (a communication network provided by a communication service provider for use with mobile terminals such as smartphones or mobile telephones).

It is sufficient for there to be one or more automobiles 900 that are data collection targets in the driving situation information acquisition system 2.

Among the units in FIG. 6, the portions having functions similar to those corresponding to the units in FIG. 1 are assigned the same reference symbols (110, 120, 210, 280, 290, 291, 292, 293, 310, 320, 900, 910, 920, 930, 941, 942) and the explanations thereof will be omitted. In the example in FIG. 6, the driving situation information acquisition device 201 is installed outside the vehicle, and the communication device 410 is installed in the vehicle for communication between the driving assistance device and the devices in the vehicle (in the automobile 900).

The driving situation information acquisition unit 494 computes an assessment value of looks at an obstacle by the driver by applying, to assessment criteria determined by the assessment criteria determination unit 293, the direction of the driver's line of sight detected by the line-of-sight direction detection unit 291 and the position of the obstacle detected by the obstacle detection unit 292. The method by which the driving situation information acquisition unit 494 computes the assessment value of looks at an obstacle by the driver is the same as that in the case of the warning processing unit 294 in FIG. 1. The assessment value of looks at an obstacle by the driver serves as an indicator value for determining whether or not a driver's looks are appropriate. In this regard, the assessment value of the looks at an obstacle by the driver can be considered to be a type of driving situation information. The driving situation information mentioned here is information indicating the driving situation.

The driving situation information acquisition unit 494 may further determine at least one of whether or not a warning needs to be issued to the driver and the level thereof, in a manner similar to the warning processing unit 294 in FIG. 1. However, the driving situation information acquisition unit 494 is located in the driving situation information acquisition device 201, which is outside the vehicle. Thus, the driving situation information acquisition unit 494 itself does not warn the driver. For this reason, it is called the driving situation information acquisition unit instead of the warning processing unit.

When the driving situation information acquisition unit 494 decides at least one of whether or not a warning needs to be issued to the driver and the level thereof, it generates information indicating the decision, i.e. information indicating at least one of whether or not a warning needs to be issued to the driver and the level thereof. Furthermore, the driving situation information acquisition unit 494 transmits to the on-board system 400, via the communication unit 210 and the network 950, the information indicating at least one of whether or not a warning needs to be issued to the driver and the level thereof. In the on-board system 400, one or both of the display device 310 and the audio output device 320 warn the driver in accordance with the information from the driving situation information acquisition device 201.

By installing the driving situation information acquisition device 201 outside the vehicle and having it function as a server for the on-board system 400, it is possible for the driving situation information acquisition device 201 to collect information from the on-board system 400 in addition to or instead of providing driving assistance to the driver as in the case of the first example embodiment and the second example embodiment. For example, the driving situation information acquisition unit 494 may store information indicating the driving situation in the storage unit 280 in addition to or instead of transmitting, to the on-board system 400, the information for providing the warning as described above.

The information indicating the driving situation mentioned here may be one or both of the assessment value of looks at the obstacle by the driver and information indicating whether or not a warning needs to be issued to the driver and the level thereof. Alternatively, it may include any of information on the environs of the automobile 900, such as position information regarding obstacles in the environs of the automobile 900, information indicating the state of the automobile 900 such as the speed of the automobile 900, and information indicating the state of the driver, such as the frequency of blinking by the driver, or combinations thereof.

Thus, in the second example embodiment, the driver is not necessarily warned, and they are referred to as the driving situation information acquisition system and the driving situation information acquisition device.

When the driver is not to be warned, it is not essential for the on-board system 400 to include a display device 310 and an audio output device 320.

On the other hand, if the driving situation information acquisition system 2 is to warn the driver, then the driving situation information acquisition system may be referred to as a driving assistance system. Additionally, the driving situation information acquisition device may be referred to as a driving assistance device.

FIG. 6 illustrates an example of a case in which the on-board system 400 is mounted on the automobile 900; however, as in the case of FIG. 1, the moving body on which the on-board system 400 is mounted is not limited to an automobile. The moving body may include various vehicles that need to be driven with attention to obstacles in the environs thereof.

Due to the server-client configuration of the driving situation information acquisition system 2, a user (for example, a business providing a driving assistance service) of the driving situation information acquisition device 201 can confirm the driving situation remotely, and can determine whether or not the driving was dangerous.

Furthermore, the user of the driving situation information acquisition device 201 can provide the driver with driving safety guidance by using scenes in which the driving was judged to be dangerous. When doing so, it is possible to provide safe driving guidance, such as by providing information, not only to the driver that performed the driving that was judged to be dangerous, but also to other drivers.

Next, the structure of a third example embodiment of the present invention will be explained with reference to FIG. 7 and FIG. 8.

Figure 7:
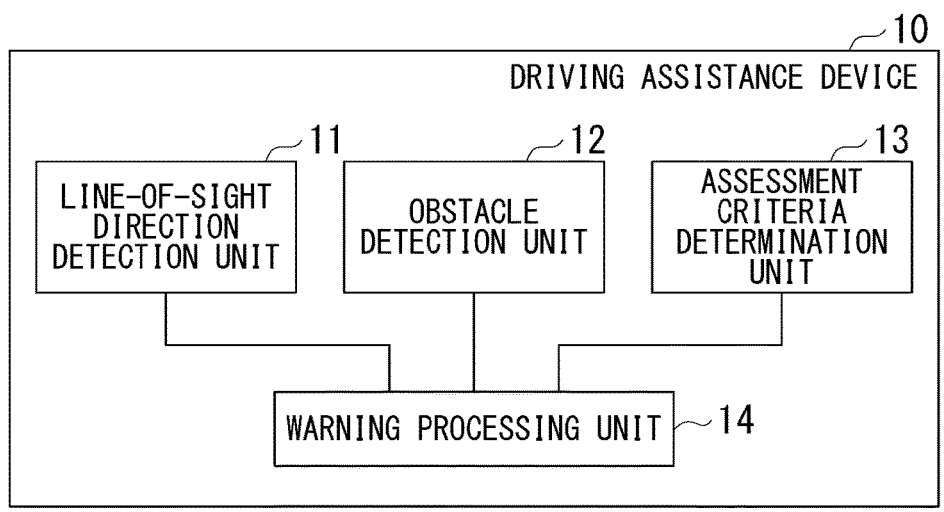
FIG. 7 is a diagram illustrating an example of the structure of a driving assistance device according to a third example embodiment of the present invention.

FIG. 7 is a diagram illustrating the structure of the driving assistance device according to the third example embodiment of the present invention. The driving assistance device 10 illustrated in FIG. 7 includes a line-of-sight direction detection unit 11, the obstacle detection unit 12, the assessment criteria determination unit 13 and the warning processing unit 14.

With this structure, the line-of-sight direction detection unit 11 detects the direction of the line of sight of the driver of a moving body. The obstacle detection unit 12 detects the positions of obstacles in the environs of the moving body. The assessment criteria determination unit 13 determines assessment criteria of looks at an obstacle by the driver based on at least one of the time, the location, the weather, the state of the automobile 900, and the state of the driver. The warning processing unit 14 assesses the looks at obstacles by the driver by applying, to assessment criteria, a score computed on the basis of the direction of the driver's line of sight and the positions of obstacles, and determines, on the basis of the assessment results, at least one of whether or not a warning needs to be issued to the driver and the level thereof.

Thus, by the assessment criteria determination unit 293 changing the assessment criteria in accordance with the conditions while driving, the frequency of warnings to the driver can be reduced, and in situations with relatively high risk, it can be made easier for decisions to issue warnings to occur. In this regard, according to the driving assistance device 10, it is possible to ensure both that frequent warnings are avoided and that warnings are issued when there is a possibility that danger will occur.

Figure 8:
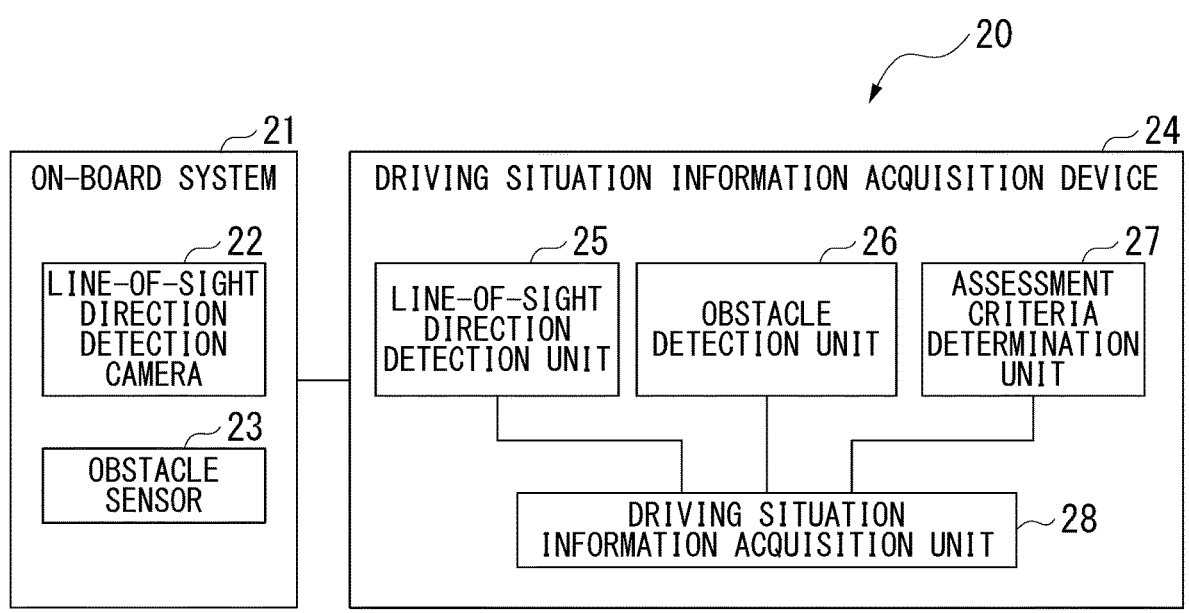
FIG. 8 is a diagram illustrating an example of the minimum structure of a driving situation information acquisition system according to a fourth example embodiment of the present invention.

FIG. 8 is a diagram illustrating an example of the structure of a driving situation information acquisition system according to a fourth example embodiment of the present invention. The driving situation information acquisition system 20 illustrated in FIG. 8 includes an on-board system 21 and a driving situation information acquisition device 24. The on-board system 21 includes a line-of-sight direction detection camera 22 and an obstacle sensor 23. The driving situation information acquisition device 24 includes a line-of-sight direction detection unit 25, an obstacle detection unit 26, an assessment criteria determination unit 27 and a driving situation information acquisition unit 28.

In this structure, the on-board system 21 is mounted on a moving body. The driving situation information acquisition device 24 communicates with the on-board system 21. The line-of-sight direction detection camera 22 captures images of the face of the driver of the moving body. The obstacle sensor 23 is a sensor for detecting obstacles in the environs of the moving body. The line-of-sight direction detection unit 25 detects the direction of the driver's line of sight based on the images of the driver's face. The obstacle detection unit 26 detects the position of an obstacle in the environs of the moving body based on sensing data from the obstacle sensor 23. The assessment criteria determination unit 27 determines assessment criteria of looks at the obstacle by the driver based on at least one of the time, the location, the weather, the state of the host vehicle and the state of the driver. The driving situation information acquisition unit computes the assessment value of the looks at the obstacle by the driver by applying, to the assessment criteria, a score computed on the basis of the direction of the driver's line of sight and the position of the obstacle.

Thus, the assessment criteria determination unit 293 can assess looks by the driver with higher precision by changing the assessment criteria in accordance with conditions while driving such as by assessing the scores of looks using mirrors to be lower, for example, in the case of rain.

A program for realizing all or some of the processes performed by the control unit 290 may be recorded on a computer-readable recording medium, and the processes performed by each unit may be performed by reading the program recorded in this recording medium into a computer system, and executing the program. In this case, the "computer system" includes an OS and hardware such as peripheral devices.

Additionally, the "computer-readable recording medium" refers to portable media such as flexible disks, magneto-optic disks, ROMs and CD-ROMs, and storage devices such as hard disks contained in computer systems. Additionally, the above-mentioned program may be for realizing some of the aforementioned functions, and furthermore, the aforementioned functions may be realized by being combined with a program already recorded in the computer system.

While example embodiments of this invention have been explained in detail above with reference to the drawings, the specific structure is not limited to these example embodiments, and designs and the like within a range not departing from the spirit of the present invention are included.

INDUSTRIAL APPLICABILITY

The present invention may be applied to a driving assistance device, a driving situation information acquisition system, a driving assistance method, and a program.

REFERENCE SYMBOLS

1 Driving assistance system
2, 20 Driving situation information acquisition system
10, 200 Driving assistance device
11, 25, 291 Line-of-sight direction detection unit
12, 26, 292 Obstacle detection unit
13, 27, 293 Assessment criteria determination unit
14, 294 Warning processing unit
21, 400 On-board system
22, 110 Line-of-sight direction detection camera
23, 120 Obstacle sensor
24, 201 Driving situation information acquisition device
28, 494 Driving situation information acquisition unit
210 Communication unit
280 Storage unit
290 Control unit
310 Display device
320 Audio output device
910 Video presentation camera
920 Video presentation device
930 Rearview mirror
941 Left sideview mirror
942 Right sideview mirror
950 Network

The invention claimed is:

1. A driving assistance device comprising:
   at least one memory configured to store instructions; and
   at least one processor configured to execute the instructions to:
      detect a direction of a line of sight of a driver of a moving body;
      detect a position of an obstacle in environs of the moving body;
      assess a look at the obstacle by the driver based on the direction of the line of sight, the position of the obstacle, and a type of look by which the driver saw the obstacle; and
      determine at least one of whether or not a warning needs to be issued to the driver and a level of the warning, based on an assessment result,
   wherein assessing comprises:
      computing a score by adding up values obtained by multiplying a period of time during which the driver saw the obstacle or a number of times that the driver saw the obstacle by a coefficient corresponding to the type of look by which the driver saw the obstacle; and
      obtaining the assessment result based on at least the score.

2. The driving assistance device according to claim 1, wherein assessing further comprises:
   determining assessment criteria of the look at the obstacle by the driver based on at least one of time, location, weather, a state of the moving body, and a state of the driver, and
   obtaining the assessment result comprises:
   obtaining the assessment result by applying the score to the assessment criteria.

3. The driving assistance device according to claim 1, wherein the at least one processor is configured to execute the instructions to determine that the driver saw an obstacle about which a warning is being issued in a video displayed by a video presentation device when the line of sight of the driver is directed towards the video presentation device.

4. The driving assistance device according to claim 1, wherein determining the at least one of whether or not the warning needs to be issued to the driver and the level of the warning comprises determining the at least one of whether or not the warning needs to be issued to the driver and the level of the warning based on a relationship between a state of the moving body and the position of the obstacle.

5. A driving situation information acquisition system comprising:
an on-board system that is to be mounted on a moving body; and
a driving situation information acquisition device that communicates with the on-board system,
wherein the on-board system comprises:
a line-of-sight direction detection camera that captures an image of a face of a driver of the moving body; and
an obstacle sensor for detecting an obstacle in environs of the moving body, and
wherein the driving situation information acquisition device comprises:
at least one memory configured to store instructions; and
at least one processor configured to execute the instructions to:
detect a direction of a line of sight of the driver based on the image of the face of the driver;
detect a position of the obstacle in the environs of the moving body based on sensing data from the obstacle sensor; and
assess a look at the obstacle by the driver based on the direction of the line of sight, the position of the obstacle, and a type of look by which the driver saw the obstacle,
wherein assessing comprises:
computing a score by adding up values obtained by multiplying a period of time during which the driver saw the obstacle or a number of times that the driver saw the obstacle by a coefficient corresponding to the type of look by which the driver saw the obstacle; and
obtaining an assessment result based on at least the score.

6. A driving assistance method comprising:
detecting a direction of a line of sight of a driver of a moving body;
detecting a position of an obstacle in environs of the moving body;
assessing a look at the obstacle by the driver based on the direction of the line of sight, the position of the obstacle, and a type of look by which the driver saw the obstacle; and
determining at least one of whether or not a warning needs to be issued to the driver and a level of the warning, based on an assessment result,
wherein assessing comprises:
computing a score by adding up values obtained by multiplying a period of time during which the driver saw the obstacle or a number of times that the driver saw the obstacle by a coefficient corresponding to the type of look by which the driver saw the obstacle; and
obtaining the assessment result based on at least the score.

7. The driving assistance device according to claim 1, wherein the at least one processor is configured to execute the instructions to determine the level of the warning to the driver, based on the assessment result.

8. The driving assistance device according to claim 1, wherein the type of look is a direct look, a look through a mirror, or a look through a monitor screen.

* * * * *